US012692797B1

(12) United States Patent
Surace

(10) Patent No.: US 12,692,797 B1
(45) Date of Patent: Jul. 28, 2026

(54) CERAMIC MATRIX COMPOSITE SEAL REPAIR

(71) Applicant: RTX CORPORATION, Farmington, CT (US)

(72) Inventor: Raymond Surace, Newington, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/038,071

(22) Filed: Jan. 27, 2025

(51) Int. Cl.
*F01D 11/08* (2006.01)
*F01D 25/24* (2006.01)

(52) U.S. Cl.
CPC ............ *F01D 11/08* (2013.01); *F01D 25/243* (2013.01); *F01D 25/246* (2013.01); *F05D 2230/80* (2013.01); *F05D 2240/11* (2013.01); *F05D 2260/30* (2013.01); *F05D 2300/6033* (2013.01)

(58) Field of Classification Search
CPC ........ F01D 11/08; F01D 11/12; F01D 11/122; F01D 11/125; F01D 11/127; F01D 25/246; F01D 25/243; F01D 25/005; F05D 2240/11; F05D 2300/6033; F05D 2230/80; F05D 2260/30
See application file for complete search history.

(56) References Cited

U.S. PATENT DOCUMENTS

| | | | | |
|---|---|---|---|---|
| 10,724,388 | B2 | 7/2020 | Chevallier et al. | |
| 11,326,474 | B2 | 5/2022 | Freeman et al. | |
| 12,359,585 | B1 * | 7/2025 | Campbell | F01D 25/246 |
| 2006/0292001 | A1 * | 12/2006 | Keller | F01D 25/246 415/170.1 |
| 2021/0156311 | A1 * | 5/2021 | Lutjen | F01D 11/005 |
| 2021/0180521 | A1 * | 6/2021 | Whittle | F01D 25/246 |
| 2023/0193775 | A1 * | 6/2023 | Freeman | F01D 11/122 415/173.4 |
| 2023/0313709 | A1 * | 10/2023 | Holleran | F01D 25/005 415/173.1 |

* cited by examiner

*Primary Examiner* — Christopher Verdier
(74) *Attorney, Agent, or Firm* — Carlson, Gaskey & Olds, P.C.

(57) ABSTRACT

A gas turbine engine includes a seal support that has first and second spaced-apart support flanges and a ceramic matrix composite (CMC) seal that is affixable to the seal support. The support flanges have at least one set of support flange pin holes. The CMC seal includes a radially inwardly-facing side and a radially outwardly-facing side. the radially outwardly-facing side has first and second spaced-apart seal flanges that include two independent sets of support flange pin holes. The CMC seal is affixable to the seal support by alignment of either one of the two independent sets of support flange pin holes with the support flange pin holes and receipt of support pins there through.

12 Claims, 3 Drawing Sheets

CERAMIC MATRIX COMPOSITE SEAL REPAIR

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Turbine section components are typically formed of a superalloy and may include thermal barrier coatings to extend temperature capability and lifetime. Ceramic matrix composite ("CMC") materials are also being considered for such components. Among other attractive properties, CMCs have high temperature resistance. Despite this attribute, however, there are unique challenges to implementing CMCs in the turbine section.

SUMMARY

A gas turbine engine according to an example of the present disclosure includes a seal support that has first and second spaced-apart support flanges that have at least one set of support flange pin holes. A ceramic matrix composite (CMC) seal includes a radially inwardly-facing side and a radially outwardly-facing side. The radially outwardly-facing side has first and second spaced-apart seal flanges that include two independent sets of support flange pin holes. The CMC seal is affixable to the seal support by alignment of either one of the two independent sets of support flange pin holes with the at least one set of support flange pin holes and receipt of support pins there through.

In a further embodiment of any of the foregoing embodiments, the one of the two independent sets of support flange pin holes that is in receipt of the support pins includes insert bushings and the other one of the two independent sets of support flange pin holes that is not in receipt of the support pins excludes insert bushings.

In a further embodiment of any of the foregoing embodiments, the support flange pin holes are elongated slots.

In a further embodiment of any of the foregoing embodiments, the elongated slots span the two independent sets of support flange pin holes.

A further embodiment of any of the foregoing embodiments further includes bushings in the support flange pin holes, the bushings slidable in the elongated slots so as to be selectively alignable with either of the two independent sets of support flange pin holes.

A further embodiment of any of the foregoing embodiments further includes elongated palindrome bushings in the support flange pin holes, the palindrome bushings fitting forwards or backwards into the elongated slots so as to be selectively alignable with either of the two independent sets of support flange pin holes.

In a further embodiment of any of the foregoing embodiments, the support flange pin holes are of equal hole diameters, and the support flange pin holes are spaced apart from each other by at least one hole diameter.

In a further embodiment of any of the foregoing embodiments, the at least one set of support flange pin holes includes two independent sets of support flange pin holes, one of the two independent sets of support flange pin holes corresponding to one of the two independent sets of support flange pin holes and the other of the two independent sets of support flange pin holes corresponding to the other of the two independent sets of support flange pin holes.

In a further embodiment of any of the foregoing embodiments, the support flange pin holes are drilled holes.

In a further embodiment of any of the foregoing embodiments, the CMC seal includes SiC fibers disposed in a SiC matrix.

A further embodiment of any of the foregoing embodiments further includes a compressor section, a combustor in fluid communication with the compressor section, and a turbine section in fluid communication with the combustor. The turbine section has blades disposed about a central axis of the gas turbine engine, and the seal is disposed radially outwardly of the blades.

A method of repairing a ceramic matrix composite (CMC) seal of a gas turbine engine according to an example of the present disclosure includes, in response to a first set of support flange pin holes becoming unserviceable for affixing the CMC seal to a seal support, providing a second set of support flange pin holes and using the second set of support flange pin holes to affix the CMC seal to the seal support.

In a further embodiment of any of the foregoing embodiments, the providing includes drilling the second set of support flange pin holes.

In a further embodiment of any of the foregoing embodiments, the providing includes inserting bushings in the second set of support flange pin holes.

In a further embodiment of any of the foregoing embodiments, the second set of support flange pin holes are pre-drilled.

In a further embodiment of any of the foregoing embodiments, the seal support includes first and second spaced-apart support flanges, and the first and second support flanges having at least one set of support flange pin holes to which the CMC seal is affixed.

In a further embodiment of any of the foregoing embodiments, the support flange pin holes are elongated slots that span the first and second sets of support flange pin holes.

A further embodiment of any of the foregoing embodiments further includes bushings in the support flange pin holes, the bushings slidable in the elongated slots so as to be selectively alignable with either of the first or second sets of support flange pin holes.

A further embodiment of any of the foregoing embodiments further includes elongated palindrome bushings in the support flange pin holes, the palindrome bushings fitting forwards or backwards into the elongated slots so as to be selectively alignable with either of the two independent sets of support flange pin holes.

In a further embodiment of any of the foregoing embodiments, the at least one set of support flange pin holes includes two independent sets of support flange pin holes, one of the two independent sets of support flange pin holes corresponding to the first set of support flange pin holes and the other of the two independent sets of support flange pin holes corresponding to the second set of support flange pin holes.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. In this disclosure, like reference numerals designate like elements where appropriate and reference numerals with the addition of one-hundred or multiples thereof designate modified elements that are understood to incorporate the same features and benefits of the corresponding elements. The drawings that accompany the detailed description can be briefly described as follows.

DETAILED DESCRIPTION

Figure 1:
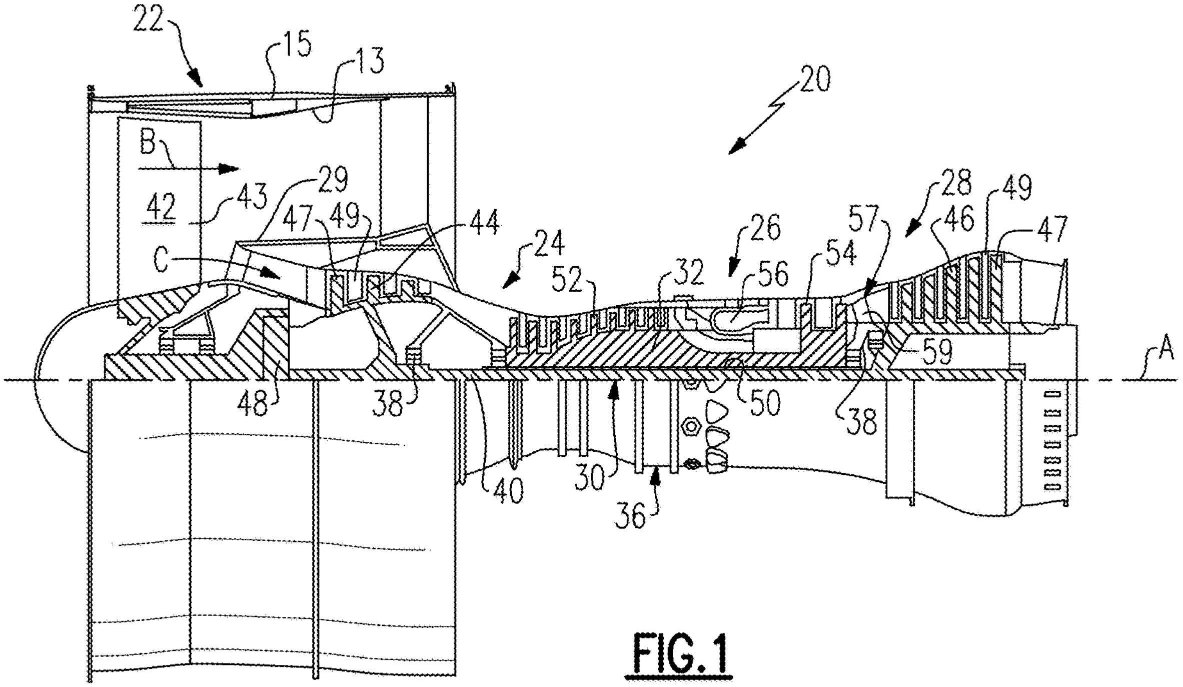
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axis.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. It should be understood that the teachings disclosed herein may be utilized with various engine architectures, such as low-bypass turbofan engines, prop fan and/or open rotor engines, turboprops, turbojets, etc. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram } ° \text{ R})/(518.7° \text{ R})]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2:
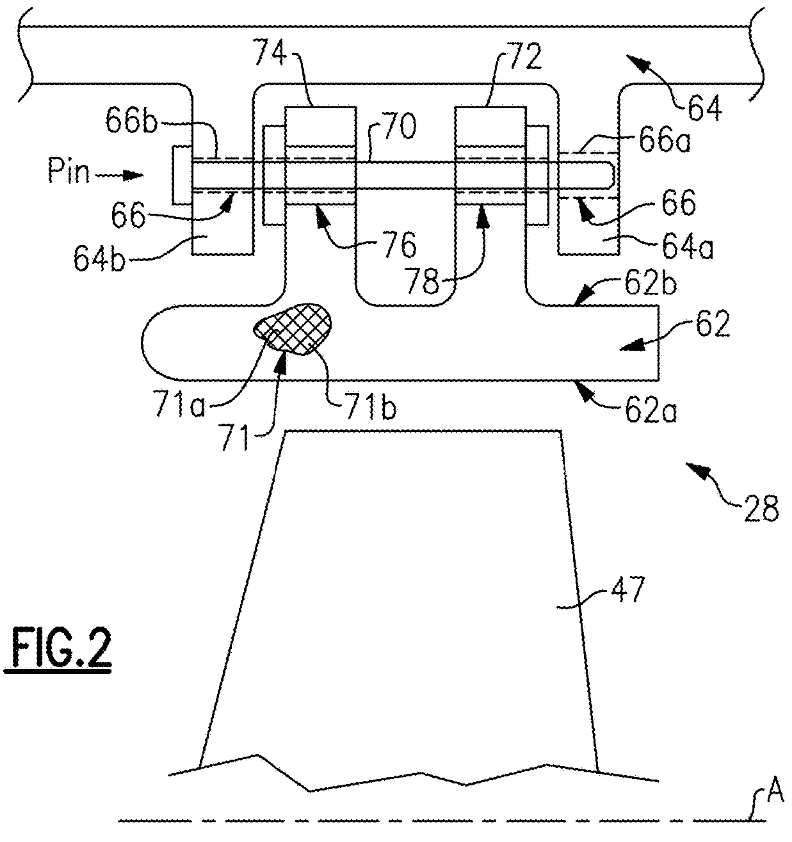
FIG. 2 illustrates a portion of a turbine section of the engine.

FIG. 2 illustrates a portion of the turbine section 28. The turbine section 28 includes a row of turbine blades 47 that are rotatable about the engine axis A. Located radially outwardly of the blades 47, there is a circumferential row of blade outer air seals 62 that are affixed to a seal support 64, such as an engine case or an intermediate support frame that is mounted to an engine case.

Figure 3:
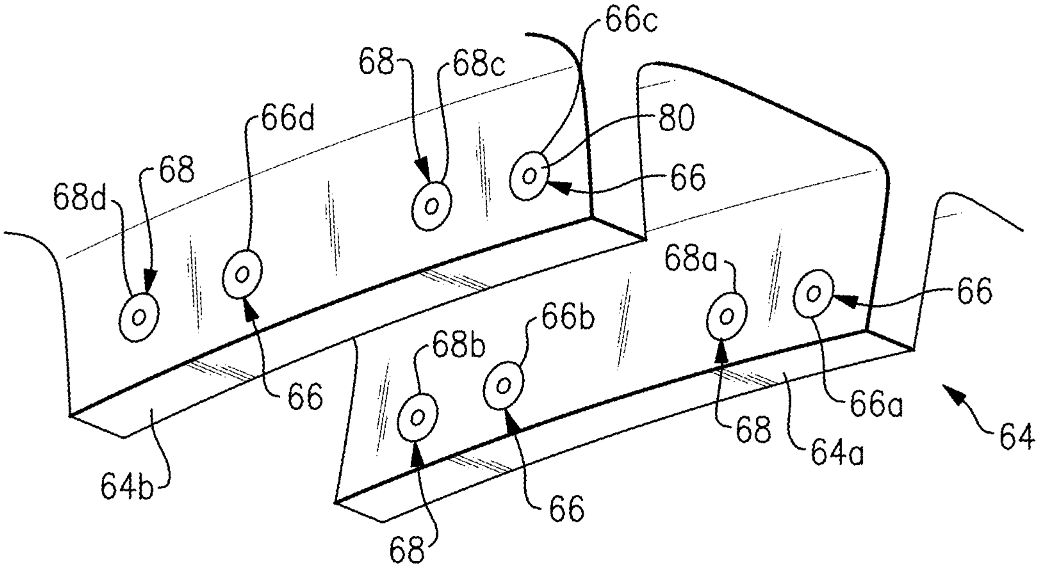
FIG. 3 illustrates a portion of a seal support of the engine.

The seal support 64 includes first and second spaced-apart support flanges 64*a*/64*b*. Referring to FIG. 3 that shows an isolated view of a portion of the seal support 64. The support flanges 64*a*/64*b* have at least one set 66 of support flange pin holes. The pin holes in set 66 are labelled as 66*a*, 66*b*, 66*c*, and 66*d*. In this example, the seal support 64 includes a second set 68 of pin holes, labelled 68*a*, 68*b*, 68*c*, and 68*d*. The hole 66*a* aligns with the hole 66*c*, the hole 66*b* aligns with the hole 66*d*, the hole 68*a* aligns with hole 68*c*, and the hole 68*b* aligns with hole 68*d*. Each of these pairs of aligned holes is able to receive a support pin 70 (FIG. 2) there through, though only one set 66 or 68 is used at a time for affixing the seal 62, while the other set 68 or 66 serves as an auxiliary set for repair. As understood herein, a "set" refers to elements, such as pin holes, that are configured to be used together. For example, the pin holes 66*a*, 66*b*, 66*c*, and 66*d* are spaced apart to match corresponding holes in the seal 62 and are used together to affix the seal 62.

Returning to FIG. 2, each of the seals 62 are formed of a ceramic matrix composite (CMC) 71, shown in cutaway. The CMC 71 is comprised of ceramic fiber plies 71*a* in a ceramic matrix 71*b*. Example ceramic matrices are silicon-containing ceramics, such as but not limited to, a silicon carbide (SiC) matrix or a silicon nitride (Si3N4) matrix. Ceramic fibers are formed of bundles of filaments and may include, but are not limited to, silicon carbide (SiC) fibers or silicon nitride (Si3N4) fibers. The CMC 71 may be, but is not limited to, a SiC/SiC CMC in which SiC fiber plies are disposed within a SiC matrix.

Figure 4:
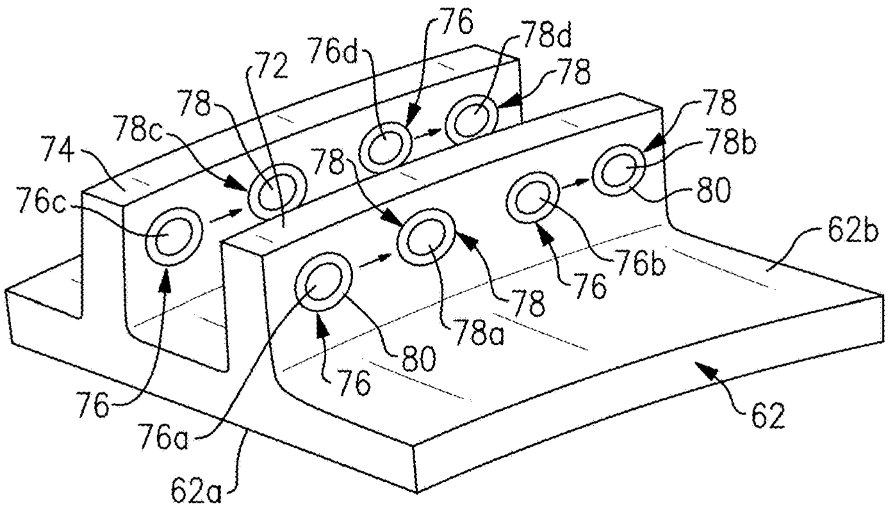
FIG. 4 illustrates a seal from the engine.

Each of the seals 62 includes a radially inwardly-facing side 62*a* (gaspath side) and a radially outwardly-facing side 62*b* (non-gaspath side). The radially outwardly-facing side 62*b* has first and second spaced-apart seal flanges 72/74 projecting outwardly therefrom that serve to affix the seal 62 with the support flanges 64*a*/64*b*. As shown in the isolated view of the seal 62 in FIG. 4, the seal flanges 72/74 include two independent sets 76/78 of support flange pin holes. The pin holes in set 76 are labelled 76*a*, 76*b*, 76*c*, and 76*d*, and the pin holes in the set 78 are labelled 78*a*, 78*b*, 78*c*, and 78*d*. The holes 76*a*/76*b* are in the first seal flange 74, the holes 76*c*/76*d* are in the second seal flange 74, the holes 78*a*/78*b* are in the first seal flange 74, and the holes 78*c*/78*d* are in the second seal flange 74. The hole 76*a* aligns with the hole 76*c*, the hole 76*b* aligns with the hole 76*d*, the hole 78*a* aligns with the hole 78*c*, and the hole 78*b* aligns with the hole 78*d*. The term "independent sets" means that each set 76/78 is configured to affix the seal 62 with the seal support 64 without use of or reliance on the other set 78/76. That is, only one set 76 or 78 of holes is used at a time to affix the seal 62.

In the illustrated example, each of the holes in the sets 76/78 and in the sets 66/68 of the seal support 64 includes an insert bushing 80, which is a generally cylindrical sleeve that extends in the respective hole that serves to reduce friction and wear between the support pin 70 and the sides of the holes.

The seal 62 is affixable to the seal support 64 by alignment of the holes of sets 76 with the holes of set 66 of the seal support 64 and then receipt of support pins 70 through aligned ones of the holes, or by alignment of the holes of set 78 with the holes of set 68 of the seal support 64 and then receipt of support pins 70 through aligned ones of the holes. That is, the seal 62 is affixed by use of set 66 with set 76 or by use of set 68 with set 78.

For example, the sets 66/76 and 68/78 enable repair of the seal 62 in order to extend service life. For instance, the seal 62 may initially be affixed via sets 66/76. After a period of use in the engine 20 however, the seal 62 may exhibit damage in and around the holes or bushings 80. Such damage may include, but is not limited to, cracking, shear tear-out of material, wear, spalling, degradation, or recession. Cracking refers to a breakage and splitting in the CMC 71. Wear refers a loss of material due to relative motion and friction. Shear tear-out refers to a rupture in the material in or around a hole due to shear stress from the bushing 80 and/or support pin 70 reaction load. Spalling refers to a loosening or detachment of the CMC material. Degradation refers to oxidation of the CMC material. Recession refers to a loss of material due to reaction and volitilization of silicon-containing ceramics, such as silicon carbide.

Such damage may be detected via borescope inspection or engine tear-down. The damage may render a seal unserviceable. However, if a damaged seal can be repaired, the service life can be extended. Unserviceable is understood to mean that a seal includes an extent of damage that is deemed to render the seal unsuitable for further use in the engine 20.

An examination and evaluation of the seals 62 may be conducted in order to determine severity and thus whether a seal 62 is a candidate for repair. The examination may include, but is not limited to, visual inspection with or without magnification, acoustic inspection, structured light inspection, thermal imaging or CT scan inspection.

Upon identification of a seal 62 that is damaged and repairable, the seal 62 is provided for a repair process. For example, the repair process includes preparing the seal 62 and/or seal support 64 for affixation of the seal 62 to the seal support 64 by the hole sets 68/78 instead of the holes sets 66/76 that exhibit the damage. That is, once the hole sets 66/76 are deemed to be no longer usable, the seal 62 is re-mounted in the engine 20 using hole sets 68/78. The holes of the hole sets 68/78 may already be present, e.g., by pre-drilling, and may or may not initially have bushings 80. If the pre-drilled holes do not have bushings 80, new bushings 80 may be inserted as part of the repair process, or the bushings 80 may be removed from the hole sets 66/76 and inserted into the holes of sets 68/78.

Alternatively, one or more of the holes of the sets 68/78 may be drilled as part of the repair process, after removal of the damaged seal 62 from the engine 20. For instance, one or more of the holes 78*a*, 78*b*, 78*c*, and 78*d* are not present when the seal 62 is removed from the engine 20 for repair, but are then drilled after removal so that the seal 62 can continue to be used, but without reliance on the damaged holes from the sets 66/76. Likewise, one or more of the holes 68*a*, 68*b*, 68*c*, and 68*d* are not present in the seal support 64 when the seal 62 is removed from the engine 20 for repair, but are then drilled after removal so that the seal 62 can continue to be used, but without reliance on the damaged holes from the sets 66/76. In these instances, the holes 76*a*/76*b*, 76*c*, and 76*d* are located such that there is available adjacent space for the holes 78*a*, 78*b*, 78*c*, and 78*d*, and the holes 66*a*, 66*b*, 66*c*, and 66*d* are located such that there is available adjacent space for the holes 68*a*, 68*b*, 68*c*, and 68*d*.

In further examples, the holes of the set 76 are of equal diameter to each other and the holes of the set 78 are of equal diameter to each other and to the holes of set 76 (the diameters of the holes of sets 66 and 68 in the seal support 64 may also be equivalent to each other and to the holes of sets 76 and 78). In further examples, the holes 78*a*, 78*b*, 78*c*, and 78*d* are spaced apart from respective holes 76*a*, 76*b*, 76*c*, and 76*d* by at least one hole diameter, such as by 1.1 hole diameters, by 1.5 hole diameters, by 2 hole diameters, or by 3 hole diameters. Particularly in ceramics, such spacing may facilitate avoiding initiation or propagation of cracking during drilling operations, and avoid propagation of cracks that may be near the holes 76*a*, 76*b*, 76*c*, and 76*d*.

Figure 5:
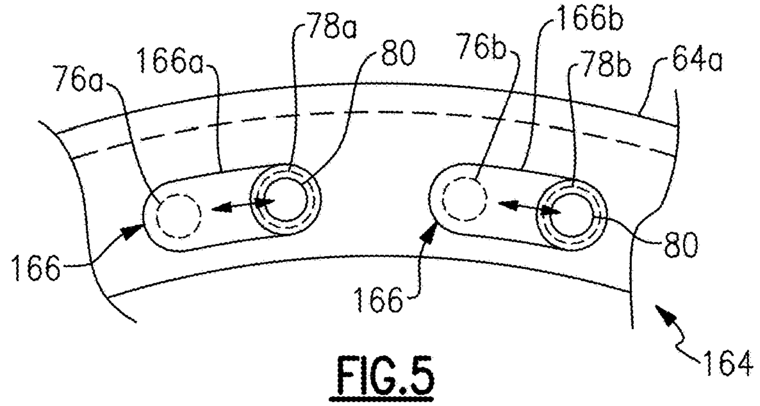
FIG. 5 illustrates a portion of another example of a seal support that has slidable bushings.

FIG. 5 illustrates an axial view of the seal flange 64*a* of another example seal support 164. It is to be understood that the other seal flange 64*b* of seal support 164 is identically shaped as the seal flange 64*a*. In this example, there is a set 166 of support flange pin holes, which are labelled 166*a* and 166*b*. However, rather than circular pin holes as in the prior examples, the holes 166*a*/166*b* are elongated slots. The slots 166*a* and 166*b* are elongated in a circumferential direction relative to the engine axis A and span the two independent sets 76/78 of support flange pin holes of the seal 62. For instance, slot 166*a* spans holes 76*a* and 78*a*, and slot 166*b* spans holes 76*b* and 78*b*. There is a bushing 80 in each slot 166*a*/166*b*. The bushings 80 are slidable in the respective slots 166*a*/166*b* so as to be selectively alignable with either of the two independent sets 76/78 of support flange pin holes. For instance, the bushing 80 in slot 166*a* can slide to align with the hole 76*a* or the hole 78*a*, and the bushing 80 in slot 166*b* can slide to align with hole 76*b* or 78*b*. Likewise, there are elongated slots in the other seal support flange 64*b* with bushings 80 that can slide to align with, respectively, holes 76*c* and 78*d* and with holes 76*d* and 78*d*.

In this example, the repair process includes removing the seal 62 and moving the bushings 80 in the respective slots 166*a*/166*b* from alignment with holes 76*a* and 76*b* to alignment with holes 78*a* and 78*b*. Once the bushings are re-positioned, the seal 62 is then affixed using the second set 78 of holes in the seal 62.

Figure 6:
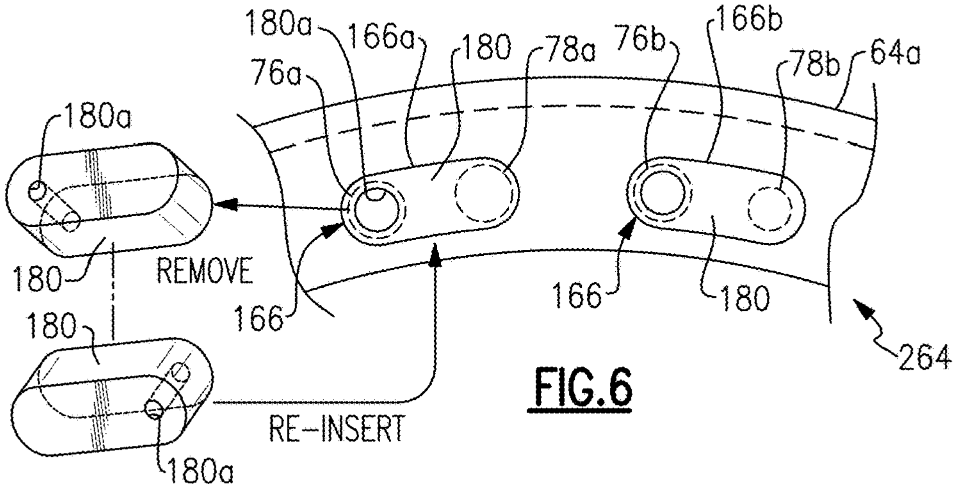
FIG. 6 illustrates a portion of another example of a seal support that has elongated bushings.

FIG. 6 illustrates an axial view of the seal flange 64*a* of another example seal support 264. It is to be understood that the other seal flange 64*b* of seal support 264 is identically shaped as the seal flange 64*a*. There is a bushing 180 in each slot 166*a*/166*b*. In this example, the bushings 180 are elongated "palindrome" bushings that have a through-hole 180*a*. The bushings 180 are removeable from the respective slots 166*a*/166*b* and insertable into the slots 166*a*/166*b* in both a forward and backward orientation, or in an inverted orientation (flipped end-over-end). In other words, if one side of the bushing is a front side and the opposite side is a back side, the bushings 180 fit into the slots 166*a*/166*b* both front-first or back first. The effect is that in one orientation the hole 180*a* aligns with holes 76*a*/76*b* and in the other orientation the hole 180 aligns with the holes 78*a*/78*b*. Thus, the bushing 180 can be inserted front first into slot 166*a* to align with the hole 76*a*, and the bushing 180 can later be removed and flipped for insertion back first so that the hole 180*a* then aligns with the hole 78*a* (or slot 166*b* to align with hole 76*b* and then flipped to align with hole 78*b*). Additionally or alternatively, the bushing 180 can be flipped end-over-end to re-orient the alignment of the hole 180*a*. Likewise, there are elongated slots in the other seal support flange 64*b* with bushings 180 that can also be flipped to align with, respectively, holes 76*c* and 76*d* and with holes 78*c* and 78*d*.

In this example, the repair process includes removing the seal 62, removing the bushings 180 from the respective slots 166*a*/166*b*, and then flipping the bushings 180 from alignment with holes 76*a* and 76*b* to alignment with holes 78*a* and 78*b*. This assumes that the bushings 180 are still in suitable shape for use, but if they are damaged or otherwise unsuitable they may instead be replaced. Once the bushings are re-inserted, the seal 62 is then affixed using the second set 78 of holes in the seal 62.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine comprising:

a seal support including first and second spaced-apart support flanges, the first and second support flanges having at least one set of support flange pin holes; and a ceramic matrix composite (CMC) seal including a radially inwardly-facing side and a radially outwardly-facing side, the radially outwardly-facing side having first and second spaced-apart seal flanges comprising two independent sets of support flange pin holes, each of the two independent sets of support flange pin holes including a first pair of aligned pin holes and a second pair of aligned pin holes that are circumferentially spaced from the first pair of aligned pin holes, wherein the CMC seal is affixable to the seal support by alignment of either one of the two independent sets of support flange pin holes with the at least one set of support flange pin holes and receipt of support pins there through.

2. The gas turbine engine as recited in claim 1, wherein the one of the two independent sets of support flange pin holes that is in receipt of the support pins includes insert bushings and the other one of the two independent sets of support flange pin holes that is not in receipt of the support pins excludes insert bushings.

3. The gas turbine engine as recited in claim 1, wherein the support flange pin holes are elongated slots.

4. The gas turbine engine as recited in claim 3, wherein the elongated slots span the two independent sets of support flange pin holes.

5. The gas turbine engine as recited in claim 4, further comprising bushings in the support flange pin holes, the bushings slidable in the elongated slots so as to be selectively alignable with either of the two independent sets of support flange pin holes.

6. The gas turbine engine as recited in claim 4, further comprising elongated palindrome bushings in the support flange pin holes, the palindrome bushings fitting forwards or backwards into the elongated slots so as to be selectively alignable with either of the two independent sets of support flange pin holes.

7. The gas turbine engine as recited in claim 1, wherein the support flange pin holes are of equal hole diameters, and the support flange pin holes are spaced apart from each other by at least one hole diameter.

8. The gas turbine engine as recited in claim 1, wherein the at least one set of support flange pin holes includes two independent sets of support flange pin holes, one of the two independent sets of support flange pin holes corresponding to one of the two independent sets of support flange pin holes and the other of the two independent sets of support flange pin holes corresponding to the other of the two independent sets of support flange pin holes.

9. The gas turbine engine as recited in claim 1, wherein the support flange pin holes are drilled holes.

10. The gas turbine engine as recited in claim 1, wherein the CMC seal includes SiC fibers disposed in a SiC matrix.

11. The gas turbine engine as recited in claim 1, further comprising a compressor section;

a combustor in fluid communication with the compressor section; and a turbine section in fluid communication with the combustor, the turbine section having blades disposed about a central axis of the gas turbine engine, and the CMC seal is disposed radially outwardly of the blades.

12. The gas turbine engine as recited in claim 1, wherein the two independent sets of support flange pin holes are independent such that the CMC seal is affixable with the support pins to the seal support by each of the two independent sets of support flange pin holes without reliance on the other of the two independent sets of support flange pin holes to affix the CMC seal.

* * * * *